No. 867,190. PATENTED SEPT. 24, 1907.
J. E. DAVISON.
ANTIFLYING CHICKEN WING ATTACHMENT.
APPLICATION FILED MAR. 2, 1907.
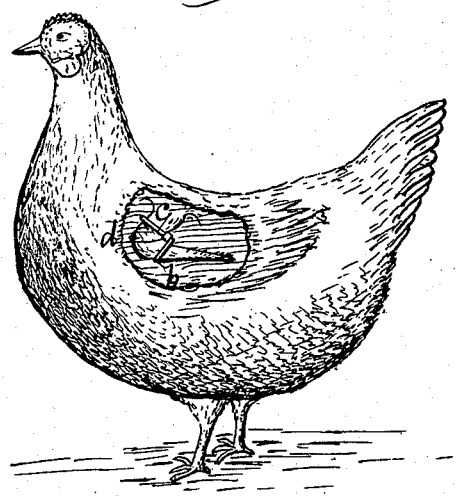
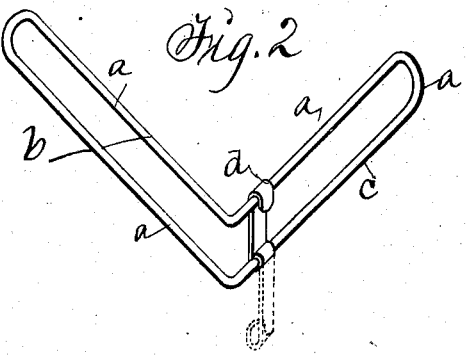

UNITED STATES PATENT OFFICE.

JAMES EARL DAVISON, OF NEW YORK, IOWA.

ANTIFLYING CHICKEN-WING ATTACHMENT.

No. 867,190.        Specification of Letters Patent.        Patented Sept. 24, 1907.

Application filed March 2, 1907. Serial No. 360,790.

*To all whom it may concern:*

Be it known that I, JAMES EARL DAVISON, a citizen of the United States, residing at New York, in the county of Wayne and State of Iowa, have invented a new and useful Antiflying Chicken-Wing Attachment, of which the following is a specification.

My object is to prevent the annoyances and damages incident to chicken scratching in gardens and my invention consists in a device adapted to be detachably connected with a chicken's wing as hereinafter set forth, pointed out in my claims and illustrated in the accompanying drawing, in which:

Figure 1 shows the device applied to a chicken's wing as required for practical use. Fig. 2 is a perspective view that shows how the device is constructed.

The letter $a$ designates a single length of wire doubled and its ends united by brazing, or in any suitable way as required to produce an oblong frame having parallel sides and the frame then bent into elbow-shape as shown.

The size of the wire may vary as required to have different degrees of resiliency. The length of the wire may also vary as required to produce arms $b$ and $c$ of different lengths to suit chickens of different age and size.

The arms $b$ and $c$ vary in length and hook $d$ preferably flat, as shown, is hinged to one of the arms in such a manner that by pressing the parallel parts of the wire towards each other the hook can be freed to hang down as indicated by dotted lines in Fig. 2.

To apply the device to a chicken's wing as shown in Fig. 1, when the parallel parts of the wire in the arms are disconnected by releasing the hook from one of them, the device can be readily slipped backward over the elbow of the wing and by pressing the two parallel parts of the arms $b$ and $c$ towards each other the hook $d$ can be replaced and retained, by the resiliency of the wire when pressure is relaxed, and the hook will be in the inner corner of the wing and will prevent the device from slipping off and the chicken will be prevented from spreading the wing as required to fly and thereby prevented from getting over a fence into a neighbor's garden.

It is obvious this anti-flying attachment may be placed on either the right or left wing or one on each wing.

Having thus set forth the purpose of my invention, its construction and manner of application, the practical operation and utility thereof will be obvious.

What I claim as new and desire to secure by Letters-Patent, is:—

1. As a new article of manufacture, an anti-flying attachment for chicken wings, consisting of an elbow-shaped frame made of a single wire, bent double, as shown, and a hook hinged to the frame, to operate as set forth.

2. An attachment for chicken wings to prevent flying, comprising an oblong wire frame having parallel sides bent into elbow-shape and a hook hinged to one of the sides of the frame to operate as set forth.

JAMES EARL DAVISON.

Witnesses:
    JASPER N. STARK,
    LEONARD R. MORRETT.